Feb. 5, 1957     B. E. LUBOSHEZ     2,780,140
PRISM ZOOM SYSTEM HAVING DEVIATION CORRECTING MEANS
Filed March 31, 1955     2 Sheets-Sheet 1

BENJAMIN E. LUBOSHEZ
INVENTOR.

BY Daniel I. Mayne
Harold F. Bennett
ATTORNEY & AGENT

Feb. 5, 1957 B. E. LUBOSHEZ 2,780,140
PRISM ZOOM SYSTEM HAVING DEVIATION CORRECTING MEANS
Filed March 31, 1955 2 Sheets-Sheet 2
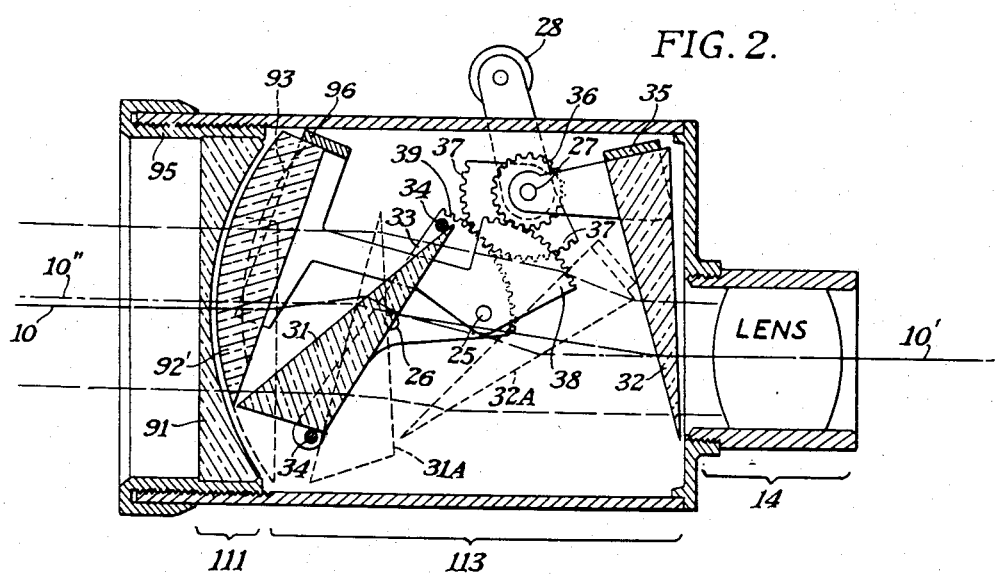
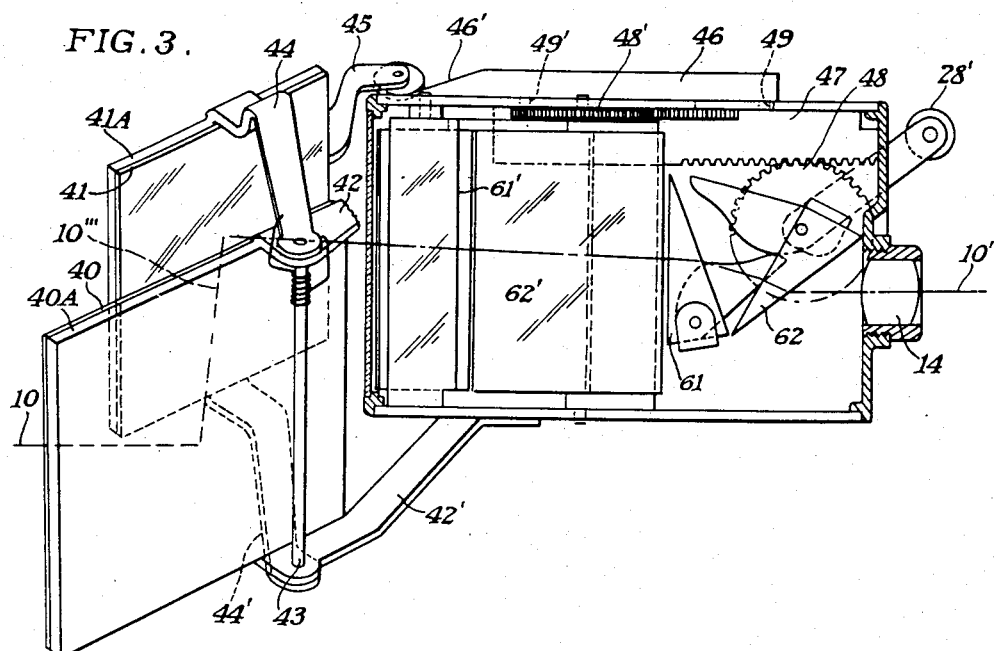
BENJAMIN E. LUBOSHEZ
INVENTOR.
BY Daniel I. Mayne
Harold F. Bennett
ATTORNEY & AGENT

United States Patent Office 2,780,140
Patented Feb. 5, 1957

2,780,140

PRISM ZOOM SYSTEM HAVING DEVIATION CORRECTING MEANS

Benjamin E. Luboshez, Rochester, N. Y., assignor to Eastman Kodak Company, Rochester, N. Y., a corporation of New Jersey Application March 31, 1955, Serial No. 498,167

9 Claims. (Cl. 88—57)

This invention relates to variable power optical systems and particularly to variable prism systems such as anamorphosers or telescopic zoom systems made up of two crossed anamorphosers in which the individual prisms are unachromatized.

Prism anamorphosers tend to introduce a unilateral chromatic aberration and also to deviate the light. Both of these effects are particularly objectionable when the optic axis is fixed or defined by an objective which forms part of the optical system.

These prism aberrations are discussed in greater detail in my copending application, Ser. No. 453,092 filed August 30, 1954. Reference is also made to Ser. No. 498,168 filed concurrently herewith, which relates to means for correcting the unilateral color in a direct view prism system, whereas the present invention relates to achromatic zoom prism systems, that is prism systems in which the unilateral color is corrected at least partially by unequal tilting of the prisms.

The object of the invention is to eliminate almost completely both the unilateral chromatic aberration and the deviation or bending of the optic axis. The present invention accomplishes this for either the variable anamorphic system or the telescopic zoom system, in a simple and thoroughly practical way.

According to the invention a variable power (either anamorphic or telescopic) system is made up of an objective—preferably focused on infinity with a collimator to focus on nearer objects—and prisms and light deviators optically aligned in front of the objective and behind the collimator if there is one. The prisms are opposed as is common in anamorphosers and are arranged to rotate in their active deviating planes (which lie on the optic axis of the system) at different speeds. In the preferred form of the invention, this rotation is such that at all times the dispersion of the second prism is approximately equal and opposite to that of the first prism multiplied by the magnification of the second prism. This minimizes the color but produces a considerable amount of deviation of the axis. Accordingly a variable light deviating means is coupled to the rotating prisms to compensate at least approximately for the residual deviation. The variable light deviators may be of any of the types commonly used in range finders but are preferably of the direct view types (as distinguished from tilting mirrors) such as oppositely rotated wedges or tilted or transversely moved plano-spheric elements. Liquid-filled wedges of variable angle or of variable index have also been proposed as variable deviators. When the invention is applied to telescopic zoom systems made up of two crossed variable power anamorphosers in front of the objective, each anamorphoser introduces deviation and the total residual deviation is the resultant of the two deviations. The variable power deviator is then coupled to compensate for this resultant.

There are three preferred embodiments of this invention.

In the first (and preferred one) of these the prisms are rotatable with the movement of one of them non-linear with respect to the other so that there is practically no residual color at all. To take full advantage of this precise correction, this embodiment employs an achromatic light deviating means such as a pair of achromatic wedges rotating oppositely in planes transverse to the optic axis or a tilting mirror.

In the second embodiment the unequal rotation of the prisms is so adjusted that the unilateral color of the zoom prism system maintains a constant ratio to the deviation thereof (within acceptable tolerances) and both aberrations are corrected simultaneously by refracting wedge means having this same ratio of dispersion to deviation.

The first embodiment is readily recognized as a species of the second in which the said ratio is zero. If on the other hand this ratio is set equal to infinity then we have the invention shown and claimed in my copending application, Serial No. 498,168 in which the deviation is substantially zero while the unilateral color varies during zooming.

The third embodiment of the invention is also a species of the second in which the unilateral color of the zoom prism system is overcorrected to such a degree that its ratio to the deviation is equal (within acceptable tolerances) to the dispersive index of the optical material of which the deviating wedge means are made, that is between 20 and 100, the range of dispersive indices of available optical materials. It is then unnecessary to achromatize the deviating wedge.

According to a preferred feature of the invention, when tolerances permit, the tilting movements of the two prisms in each pair are made linear (though unequal) with respect to each other. This simplifies the construction by permitting the use of circular gears, and is useful in any of the three embodiments of the invention although it is particularly preferred in the third embodiment both because the two aberrations have a more nearly linear relationship in this form of the invention and because this form of the invention is of more interest in applications in which economy is a consideration. It may be noted that linear movement can be used in any type of system in case the required range of magnifications is sufficiently small.

Other objects and advantages of the invention will be apparent from the following description when read in connection with the accompanying drawings in which:

Fig. 2 is a sectional view of a zoom anamorphoser according to the third form of the invention.

Fig. 3 is a left side view, with cover removed, of another embodiment of the first form of the invention.

Figure 1:
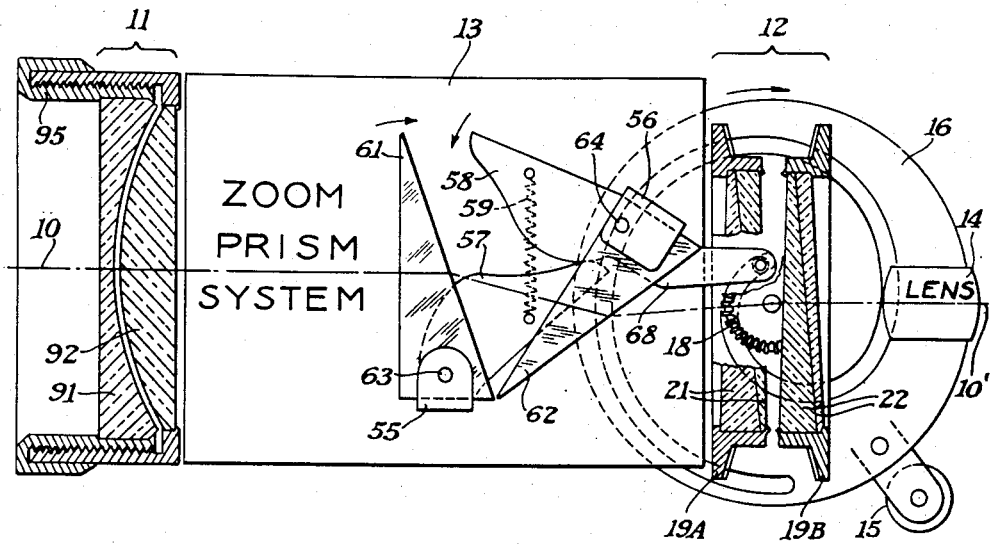
Fig. 1 is a left side view, partly in section, of a prismatic zoom system according to the first or second form of the invention.

Fig. 1 is a left side view, partly in section, of a prismatic zoom system exemplifying the first or achromatic form of the invention. With slight changes in design it also exemplifies the second form of the invention. The zoom system shown in Fig. 1 comprises a collimating lens system 11, a zoom prism system 13, a pair of deviation wedges 12 and a lens 14, shown in outline, all aligned upon an optical axis 10, 10'.

The collimating lens system consists of a movable negative lens 91 and a fixed positive lens 92 operates in known manner to collimate light from an object point so that it enters the zoom prism system as parallel light. The zoom prism system 13 comprises a pair of prisms 61, 62 mounted in shoes or clips 55, 56 for rotation about axes 63, 64 and in the plane of the optical axis. In anamorphosing prism systems, there are usually no other prisms, and in telescopic prism systems, which magnify equally in all directions, there is another pair of prisms (not shown) acting in another axial plane perpendicular to the plane of Fig. 1. In all forms of the present invention the axis 10 is deviated up to a few degrees by the prism system, and the purpose of the pair of wedges 12 is to deviate it back into its original direction. For this purpose, the wedges 21, 22 are mounted in bevel gears 19A and 19B for rotation about the optical axis in opposite directions by the bevel pinion 18 when the latter is turned by crank 15. One wedge 21 is partly cut away to show the bevel pinion 18 which meshes with the bevel gears, and the pinion is partly cut away to show the spiral cam 16 which will be described in the next paragraph. The wedges operate in known manner to deviate the light by an angle approximately equal to $2D \cos T$ where $D$ is the deviation due to one wedge and $T$ is the angular rotation of each wedge away from the position at which both wedges deviate the light in the same direction, which is designated as positive. Thus by rotating the wedges 180° the deviation is made to vary from $+2D$ to $-2D$. However, I prefer to make the wedges about 10% stronger than required for correcting the prism deviation and to rotate them approximately 130°. In prism anamorphosers the direction of deviation is in the active plane of the two prisms, while in telescope systems it is at 45°, the resultant of the deviations of two pairs of prisms.

The rotations of the prisms 61, 62 and of the wedges 21, 22 are coordinated by a system of cams. The prisms are shown in the position of magnification (in the sense of picture taking, not projection), and at this end of the zooming range, prism 62 rotates much faster than prism 61. On the other hand, at the other end of the zooming range prism 61 moves the faster. Rolling cams 57, 58, urged together by spring 59 provide a very simple and smoothly working way of providing this non-linear motion. These cams may be formed on arms of the shoes or stirrups 55, 56 and need not be made with extreme accuracy. For coordinating the rotation of the wedges with the tilting of the prisms, spiral cam 16 is provided, which rotates with crank 15 and the bevel pinion 18. An arm 68 of the shoe or clamp 56 for the rear prism carries the follower which rides in the groove of the spiral cam, in a manner too well known to need description. This arrangement of cams is illustrative only, and any equivalent arrangement can be used.

As a specific numerical example of the first form of the invention, data is given here for a zoom prism anamorphoser in which the prisms are tilted at unequal rates such that the system is achromatized, that is the F and C rays entering the front prism along the axis emerge from the second prism parallel to each other, although more or less deviated. The prisms are made of Schott SK–15 glass, $N_D=1.6229$, $V=58.1$, $(N_F-N_C)=.01072$, and have refracting angles of 21°.

*Example 1, Fig. 1*

| $N_I=N_{II}=1.6229$ | | $V_I=V_{II}=58.1$ | $A_I=-A_{II}=21°$ | |
|---|---|---|---|---|
| M | $\phi_1=I_1$ | $\phi_3$ | D | T |
| | Degrees | Degrees | Degrees | Degrees |
| 0.528 | +60.00 | −16.10 | +5.83 | 155.4 |
| 0.573 | +56.00 | −15.43 | +4.96 | 140.7 |
| 0.673 | +50.00 | −12.87 | +3.34 | 121.4 |
| 0.935 | +35.56 | −4.20 | +1.15 | 100.3 |
| 1.160 | 15.65 | +13.41 | −1.15 | 79.7 |
| 1.486 | +4.79 | +25.66 | −3.34 | 58.6 |
| 1.746 | +0.61 | +31.04 | −4.96 | 39.3 |
| 1.896 | −0.93 | +33.17 | −5.83 | 24.6 |

This table gives data for one two-prism anamorphoser, and, as mentioned before, the zoom prism system may comprise one or two such anamorphosers. In this table,
as in the tables below, N is the refractive index and V the dispersive index of the glass and A is the refracting angle of the prism, the subscripts I and II referring to the first and second prism 61 and 62 respectively. Also M is the anamorphotic or "stretch" magnification of the prism pair, $\phi$ is the slope of a prism surface and I the angle of incidence of the axial ray upon a prism surface, the subscripts 1 and 3 referring to the front surface of the first and of the second prism respectively. Finally, D is the deviation of the axis by the prism pair and T is the angular setting of one of the wedges 21 or 22 of the deviation corrector 12, the angular setting of the other wedge being numerically equal but opposite in sign. The angle T is given for a pair of wedges having a maximum deviation 10% greater than the 5.83° required so that their angular movement is only 130.8° rather than a full 180° As mentioned above and in my cofiled case, this reduces the non-linearity of motion somewhat.

Each wedge is achromatic in the conventional sense in this example, and customarily consists of two wedge elements with refracting angles of opposite sign. According to a slight modification of the customary wedge equations $$D_n = (N_n - 1) \tan A_n$$

$$\sum_{n=1}^{k} D_n = D_{max}$$

$$\sum_{n=1}^{k} \frac{D_n}{V_n} = 0$$

In these equations, the wedge elements are numbered from 1 to $k$ (usually $k=2$ for a single wedge), the subscript $n$ identifies the wedge element, and D, N, V and A are the deviation (in radians), refractive index, dispersive index and refracting angle of the individual wedge element and $D_{max}$ is the maximum deviation (in radians) which the wedge or wedge system is to produce. The first equation gives slightly too large a value of deviation when the wedge element is traversed at minimum deviation and slightly too small when one face if traversed normally, and so is very close (within about 1%) in most practical cases.

The deviation wedges in the present example, are to give a maximum deviation of 6.41°, or 3.21° for one wedge. Choosing a borosilicate crown, 1.517/64.5 and a moderately dense flint 1.605/37.9, the third equation gives $D_1=-1.70D_2$ whereupon the second gives $D_1=2.43D_{max}$ and $D_2=-1.43D_{max}$ or $D_1=7.80°$ and $D_2=-4.59°$. The first equation then gives $\tan A_1=.2633$ and $\tan A_2=.1324$. Decreasing $A_2$ about 1% because it is traversed at a steeper angle gives $A_1=14.75°$ and $A_2=-7.46°$. These values may be checked by exact calculation if desired and a closer approximation made if necessary.

Fig. 1 also illustrates the second form of the invention, in which the prism system is not exactly achromatized but the unilateral color maintains (within tolerances) a constant ratio to the axial deviation during zooming. The prism system can be either undercorrected or overcorrected for color. Ordinarily the advantages favor the undercorrected system illustrated by Example 2, below, and an overcorrected system is not considered advantageous except in the special case which constitutes the third form of the invention (illustrated in Fig. 2) in which the deviation correcting wedge is unachromatized.

Example 2 comprises the same individual prisms 61, 62 as Example 1, but the prisms are tilted to somewhat different angles relative to each other during zooming. The invention, of course, is not restricted to this prism form, and a method of designing prism systems of two different kinds of glass is discussed in reference to Example 3.

Example 2, Fig. 1

| $N_I=N_{II}=1.6229$ | $V_I=V_{II}=58.1$ | $A_I=-A_{II}=21°$ |
|---|---|---|

| M | $\phi_1=I_1$ | $\phi_3$ | D | T |
|---|---|---|---|---|
| | Degrees | Degrees | Degrees | Degrees |
| 0.513 | +57.000 | −25.262 | +3.355 | 40.32 |
| 0.624 | +50.000 | −21.459 | +2.304 | 58.43 |
| 0.763 | +40.000 | −14.668 | +1.260 | 73.36 |
| 1.299 | +6.155 | +17.643 | −1.357 | 107.96 |
| 1.570 | −0.943 | +26.386 | −2.614 | 126.45 |
| 1.861 | −5.031 | +32.031 | −3.969 | 154.43 |

The data in this table is given in the same form as under Example 1. The ratio of unilateral color to deviation has been arbitrarily set at −1 to 100 and the prism orientations for six values of magnification M computed to an accuracy such that the color, as given by the equations derived in my cofiled case, is equal to −0.01D within ±0.001° at these settings. Smooth curves through these values ordinarily suffice as a basis for laying out the cams.

The advantages of this system are that the rotations of the prisms 61, 62 are more nearly equal and that the range of magnifications is greater for a given (57°) maximum angle of incidence, and also that the deviation of the axis is smaller than in Example 1.

The angle T is given for a pair of correcting wedges having deviations of 2.20° apiece. For reasons given above the deviation per wedge is preferably somewhat larger than the 1.985° minimum requirement. The wedges are designed according to the same formulas as in Example 1 except that the dispersion or unilateral color, $(D/V)$, is −0.022° per wedge rather than zero, from which (using the same glasses) ($D_1=-(1.42+1.70D_2$). Proceeding as before gives $A_1=13.95°$ and $A_2=-8.25°$ for each wedge.

Fig. 2 is a sectional view of a zoom anamorphoser according to the third form of the invention in which the zoom prism system is overachromatized and the deviation prism is unachromatized. The section is taken in the active plane, which may be either horizontal or vertical. This system comprises a collimating lens system 111 which is adapted to perform also the function of the deviation means 12 of Figs 1 and 3, a zoom prism anamorphosing system 113 which differs in detail from that of Fig. 1 and an objective lens 14 which is preferably a standard photographic objective focused on infinity.

The collimating lens system comprises a front negative lens 91 which is mounted in a threaded ring 95 for focusing adjustment in known manner and a rear positive lens 92' which is preferably flattened on two opposite edges as shown by the outline 93 and mounted in a clamp or shoe 96 into which it may be cemented and by which it is supported for rotation about an axis 25. The axis 25 is located at the center of curvature of the front surface of the lens 92' so that rotation about this axis does not affect the collimating effect of this lens but the tilting of the plane rear face of the lens effects the deviation correction which is of the essence of this invention.

The prism zoom system comprises two prisms 31, 32. The front prism 31 is supported in a similar manner between two plates 33 held together by rods 34, the nearer plate not being shown, and is rotatable about axis 26 for zooming. The rear prism 32 is mounted in a clip or clamp 35 for rotation about axis 27. The rotation of the two prisms 31, 32 from the position of minification shown to the position of magnification indicated by dashed outlines 31A, 32A, is coordinated by gears 37, 39. The tilting of the deviation lens 92' is coordinated with that of the prisms by gears 36, 38. Gears 36, 37 and prism clip 35 are keyed or otherwise attached together to rotate together around axis 27 and are turned by crank 28, also attached thereto. Any and all of the gears may be less than a full circle, and in particular sectors 38, 39 are shown as integral with the arms of the respective lens- or prism-clamps 96, 33. Sector 37 is optionally made integral with prism-clamp 35.

The housing of the apparatus is circular at the front end for threading and is preferably square or rectangular through the main body thereof so that the axes 25, 26, 27 are conveniently mounted on flat sides thereof. A circular lip on the back is threaded or otherwise adapted for attachment to the lens 14. The two prisms are spaced apart at the position shown in full and brought close together at the position 31A, 32A, so as to keep small the lateral shift of the axis from the position 10 to the position 10'' during zooming. The wedge angle of the deviation element 92' as shown is greater than required by Example 3 below so as to emphasize the fact that the range of deviation of the zoom prism system during zooming is unsymmetrical in this form of the invention. It is to be emphasized that this wedge angle or decentered construction of the deviation element 92' is not used in quite the same manner as an ordinary deviation wedge to correct the deviation, but rather that at the middle of the zooming range the deviation of the zoom prism system may be of the order of 2° to 4° and the element 92' is decentered so as to correct this median deviation while standing at the middle of its range of movement. Optionally the deviation is corrected to a fixed non-zero angle and thereby a smaller wedge angle is used in element 92.

Example 3, set forth in the following table, illustrates a specific embodiment of this form of the invention in which the angular movements of the two prisms and the deviation wedge are linear with respect to one another.

Example 3, Fig. 2

| Element | Glass | $N_D$ | V | $N_F-N_C$ |
|---|---|---|---|---|
| 91 and 92' | BSC | 1.5170 | 64.5 | .00801 |
| 31 | BaSF-4 | 1.6511 | 38.3 | .01699 |
| 32 | F-16 | 1.5925 | 35.4 | .01673 |

TWO-PRISM ANAMORPHOSER

| Magnification, M | 0.669 | 0.746 | 0.923 | 1.167 | 1.346 |
|---|---|---|---|---|---|
| Prism Tilt: | | | | | |
| $\phi_1$ | +49.17° | +45.70° | +37.58° | +29.48° | +26.00° |
| $\phi_3$ | −10.03 | −2.29 | +15.76 | +33.81 | +41.55 |
| Deviation, D | +6.83 | +5.45 | +2.60 | −1.36 | −3.68 |
| 64.5×Dispersion $dI^*$ | +6.84 | +5.75 | +2.36 | −1.76 | −3.63 |

DEVIATION WEDGE

| Magnification, $M_x$ | 1.035 | 1.020 | 1.002 | 1.003 | 1.010 |
|---|---|---|---|---|---|
| Tilt, $\phi_x$ | +12.78° | +9.80° | +2.86° | −4.08° | −7.05° |
| Deviation, $D_x$ | −6.83 | −5.17 | −1.48 | +2.11 | +3.68 |
| 64.5×Dispersion $dI_x$ | −6.95 | −5.22 | −1.48 | +2.11 | +3.70 |

NET

| Magnification | 0.692 | 0.761 | 0.924 | 1.171 | 1.359 |
|---|---|---|---|---|---|
| Deviation | 0.00° | +0.28° | +1.12° | +0.75° | 0.00° |
| Dispersion | −.0017 | +.0073 | +.0136 | +.0054 | +.0010 |

The data in these tables is given in substantially the same form as in Tables 1 and 2 and will be readily understandable. The subscript $x$ denotes the face of the deviation wedge 92'.

In this example the dispersion or unilateral color $dI^*$ of the prism system was computed from right to left as indicated by the asterisk, and that of the deviation wedge from left to right. The net deviation and dispersion, accordingly, is as measured in the space between the deviation wedge and the prism system. The separate dispersions of the deviation wedge and the prism system as given in the table are multiplied by 64.5, the dispersive index of the deviation wedge, in order to facilitate comparisons between deviation and dispersion. The net dispersion, given in the last line, is not multiplied by this factor, however.

I have found it advantageous to use high-dispersion glass in the prisms and low-dispersion glass in the deviation wedge in this form of the invention, and to have the refractive index and dispersive index of the prism nearer the deviation wedge each larger than the respective indices of the other prism. Certain plastics such as benzol methacrylate (1.564/36.6) and polystyrene (1.592/30.8) have high dispersions (low dispersive indices) and comparatively low refractive indices favorable for use particularly in the prism farther from the deviation wedge.

The system was designed so that it is corrected at the two end-points given. The greatest deviation in this range is about 1.4° and the greatest dispersion about 0.014°. By choosing the two points for correction closer together, i. e. by rotating the deviation wedge less, these maxima can be approximately cut in half in this range while still using linear angular movements and, as already mentioned, can be decreased still further by decreasing the range of magnifications covered. Optionally, by using cam motion for the deviation wedge and retaining the linear movement for the prism system, the deviation can be corrected to 0.2° and the dispersion to about ±0.008°. The tilting of the wedge is determined by a straightforward calculation in known manner in this case and the cam is laid out by drawing a smooth curve through several points so determined.

Fig. 3 is a left side view, with cover removed, of the achromatic form of the invention in which the deviation correction means is located in front of the zoom prism system and comprises two plane mirrors 40, 41 at approximately but not exactly 45° to the axis 10. When used with a two-prism anamorphoser, lines normal to each mirror lie in a vertical or horizontal axial plane— specifically the active plane of the pair of prisms. As shown in Fig. 3, however, the mirrors are adapted to correct the deviation of a four-prism zoom telescope, which deviation is in an axial plane at 45° to the horizontal. A ray of light along the axis 10 strikes the first mirror 40 and is reflected along the path 10''' which is at an obtuse angle to axis 10 in order that the mirrors may pass a converging cone of light efficiently. The ray then strikes the second mirror 41 which is tilted by cam means described below so as to reflect the axial ray at an angle which just compensates the deviation of the zoom prism system, whereby the ray emerges along the final axis 10'. Either or both of the mirrors may be tilted at the option of the designer, and actually the face of the tiltable mirror does not need to be parallel to the axis of tilt if it is desired to arrange it in a different plane. The principles involved are believed easier to understand from the simple arrangement shown, however.

The first mirror is supported by a sheet 40A of rigid material and is held in a fixed position by a pair of brackets 42, 42' one of which is shown broken away and both of which are attached to the body of the zoom telescope. These brackets also support the axis 43 about which the second mirror 41 is rotatable. The second mirror 41 is similarly supported on a sheet 41A of rigid material and held by two brackets 44, 44' which pivot on the axis 43 just mentioned. Extending from the back of the second mirror support is a rigid neck 45 holding the cam follower which rolls on the sloping cam face 46' when the cam bar 46 is slid along, whereby the second mirror 41 is tilted. The movement of the cam bar 46 is coordinated with the zooming of the zoom system in a manner to be described shortly. The cam follower is spring urged against the cam, and of course the cam face 46' is shaped so as to give the mirror the proper tilt. The location of the axis 43 is governed by considerations of the cone angle of the cone of light to be passed and whether it will be tolerated to have the axis 10 in the object space stand at a fixed non-zero angle to the axis 10' in the image space. It is possible to use smaller mirrors if this angle does not have to be zero.

The prism system is mounted in a rectangular box, preferably with a glass window in the front to keep out dust, and comprises two pairs of prisms, 61', 62' acting in the horizontal plane and 61, 62 acting in the vertical plane. The active planes intersect along the axis 10' of the objective. It may be noted that because of the deviation of the rear pair of prisms in the state of adjustment shown, the optical axis as it passes through the front pair of prisms 61', 62' does not coincide exactly with the active plane thereof. Also, each prism is individually unachromatized and each pair is separately achromatic and operates in the manner already described with reference to Fig. 1. The zooming of the two pairs are synchronized by a rack 47 having teeth on one side which engage pinion 48 and teeth on another side which engage pinion 48', the two pinions being attached to prisms 62 and 62' and being the same size.

The cam bar 46 is attached to the rack 47 by a narrow neck 49 extending through a slot in the housing, and preferably also by a second neck 49'. These necks are detachable by screw means (not shown) for assembly and disassembly. The cam bar 46 may either be arranged with its side at 45° to the vertical or it may have its sides orthogonal and have the face 46' cut diagonally across on corner.

The prisms of each pair in the zoom prism system are coordinated in their individual movements by a pair of cams or equivalent means and may be made up in accordance with the data given as Example 1 above or any similarly designed achromatic system.

*Design of Unsymmetrical systems.*—With further reference to Example 3, above, I find that a convenient method of design of zoom prism systems in which the two prisms of a pair are made of two different kinds of glass is as follows. As a first step two prisms of the two selected glasses are computed at tilt angles near the center of the zooming range and successively closer approximations then computed with the refracting angles adjusted until the ratio of dispersion to deviation has roughly the preselected value. At both ends of the zooming range the more steeply tilted prism is assigned its preselected maximum tilt and by successive approximations the tilt angle of the other prism is determined. In case the preselected maximum tilt is too high there is no solution and it must be decreased. By interpolating the linearly related rotations of the two prisms between the two extreme values, a closer approximation to the tilts of the two prisms at mid-range is determined, whereupon the system is recomputed for the mid-range position and the ratio of the two refracting angles changed if necessary. Each repetition of this process gives a closer approximation to a system which is corrected at the three pre-selected points in the zooming range unless too great a range of magnifications has been selected.

The examples given are illustrative only, and the invention is not limited thereto but includes such modifications as making the prisms of other available materials ranging from 1.39 to about 1.85 in refractive index and with different refracting angles in the range from about 8° to about 35°, and is of the scope of the appended claims.

I claim:

1. An optical system of variable power comprising an objective, at least one pair of opposed unachromatized refracting prisms axially aligned in front of the objective with the active planes of the prisms of said pair coincident and lying on the optic axis of the objective, the first prism being positioned to receive white light, to deviate and disperse it and to transmit it to the second prism whose deviation and dispersion are in a direction opposite to that of the first, means for rotatng each prism in its active plane, means coupling the two rotating means to rotate the prisms by different amounts, the prisms being maintained in relative positions in which the dispersion of the second prism at least approximately equals the dispersion of the first prism times the magnification of the second prism, variable light deviating means also aligned in front of the objective and means operated by said coupling means for adjusting the variable light deviating means to approximately compensate for the residual deviation of the opposed prisms.

2. An optical system according to claim 1 in which the prisms rotate linearly relative to each other producing incomplete color correction with residual color in the direction opposite to that of the residual deviation and in which the variable light deviating means consists of two deviation wedges substantially perpendicular to the optic axis mounted for equal rotation in opposite directions in planes transverse to the optic axis each of said wedges being compound and overcorrected chromatically by an amount whose ratio to the deviation of that wedge is approximately the same as the ratio of the residual color to the residual deviation of the refracting prisms.

3. An optical system according to claim 1 in which one of the prisms rotates non-linearly relative to the other to maintain the dispersion of the second prism equal within tolerances to that of the first prism times the magnification of the second prism and in which the variable light deviating means is achromatic.

4. A variable anamorphic power optical system according to claim 1 in which the opposed prisms consist of one pair only.

5. A telescopic zoom optical system according to claim 1 in which there are two pairs of opposed prisms, the active plane of one pair being perpendicular to the active plane of the other pair and both planes intersecting along the axis of the objective, whereby the residual deviation of the prisms is the resultant of the deviations of each pair and the variable light deviating means is adjusted to approximately compensate for this resultant.

6. An optical system of variable power comprising an objective, at least one pair of opposed prisms axially aligned in front of the objective with their active planes coincident, whereby white light incident on the first prism is deviated and dispersed and then passes to and through the second prism whose direction of deviation and dispersion is opposite to that of the first, means for rotating each prism in its active plane, means coupling the two rotating means to rotate the prisms by unequal amounts, one of them non-linear relative to the other, the prisms being maintained at all times in the relative positions in which the dispersion of the second prism equals the dispersion of the first prism times the magnification of the second prism, variable light deviating means also aligned in front of the objective and means operated by said coupling means for adjusting the variable light deviating means to approximately compensate for the residual deviation of the opposed prisms.

7. A variable power optical system comprising an objective lens, a zoom prism system, a variable deviation system, rotating means and mounting means for maintaining the zoom prism system and the variable deviation system in optical alignment on the axis of the objective and in front thereof, the zoom prism system comprising at least one anamorphoser consisting of two refracting prisms acting in opposite directions in the same plane and the variable deviation system having rotatable means for varying the deviation thereof, in which the rotating means is adapted to rotate the prisms at different angular rates for correcting the unilateral chromatic aberration of the optical system and to rotate the rotatable means of the deviation system at a predetermined rate for correcting the deviation of the optical system as a whole.

8. A variable power optical system comprising an objective lens and, in optical alignment therewith and in front thereof, a zoom prism system and a variable deviation system. the zoom prism system comprising at least one prism anamorphoser consisting of two refracting prisms acting in opposite directions in the same plane, the optical system also comprising means for rotating the prisms of each anamorphoser in their active plane at different predetermined angular rates such that the axis is deviated by a varying amount by the anamorphoser during such rotation and the unilateral color of the anamorphoser is at least partly corrected and means for maintaining the deviation of the variable deviation system opposite and susbtantially equal to the deviation of the zoom prism system, the optical system as a whole being corrected for unilateral color within acceptable tolerances throughout the zooming range.

9. A variable power optical system according to claim 8 in which the unilateral color of each prism anamorphoser is overcorrected to a degree such that the ratio of the net angular deviation to the unilateral color is between 20 and 100 and the variable deviation means is unachromatized and is made of a glass whose dispersive index is approximately equal to said ratio.

References Cited in the file of this patent

UNITED STATES PATENTS

| | | |
|---|---|---|
| 818,553 | Phillips | Apr. 24, 1906 |
| 1,647,631 | Ives | Nov. 1, 1927 |
| 1,680,534 | Garbutt et al. | Aug. 14, 1928 |
| 1,758,801 | Moses | May 13, 1930 |
| 1,898,787 | Newcomer | Feb. 21, 1933 |
| 1,905,442 | Coors | Apr. 25, 1933 |
| 1,931,992 | Newcomer | Oct. 24, 1933 |
| 1,932,082 | Newcomer | Oct. 24, 1933 |

FOREIGN PATENTS

| | | |
|---|---|---|
| 338,962 | Great Britain | Dec. 1, 1930 |